US010177698B1

(12) United States Patent
Gao et al.

(10) Patent No.: US 10,177,698 B1
(45) Date of Patent: Jan. 8, 2019

(54) COUNTER-FIELD WINDING IN ELECTRICAL GENERATOR

(71) Applicant: THE BOEING COMPANY, Chicago, IL (US)

(72) Inventors: Lijun Gao, Renton, WA (US); Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/804,798

(22) Filed: Nov. 6, 2017

(51) Int. Cl.
| | |
|---|---|
| *H02P 7/00* | (2016.01) |
| *H02P 9/00* | (2006.01) |
| *H02P 9/10* | (2006.01) |
| *H02P 29/024* | (2016.01) |
| *H02P 11/00* | (2006.01) |

(52) U.S. Cl.
CPC .......... *H02P 9/107* (2013.01); *H02P 29/0241* (2016.02)

(58) Field of Classification Search
USPC ............................................. 322/28, 49, 63
See application file for complete search history.

(56) References Cited

U.S. PATENT DOCUMENTS

| | | | | | |
|---|---|---|---|---|---|
| 1,374,041 | A | * | 4/1921 | Turbayne | H02J 7/22 310/149 |
| 1,374,043 | A | * | 4/1921 | Turbayne | H02J 7/22 310/149 |
| 1,475,880 | A | * | 11/1923 | Rickets | H02P 9/26 310/134 |
| 1,988,288 | A | * | 1/1935 | Wilkinson | H02P 9/123 307/101 |
| 2,053,440 | A | * | 9/1936 | Powers | H02P 1/24 318/244 |
| 2,055,057 | A | * | 9/1936 | Allen | H02P 7/34 307/2 |
| 2,180,700 | A | * | 11/1939 | Tisza | H02K 23/02 322/63 |
| 2,278,632 | A | * | 4/1942 | Baer | H02P 9/00 322/28 |
| 2,325,407 | A | * | 7/1943 | Kaufmann | H02K 23/40 322/63 |

(Continued)

FOREIGN PATENT DOCUMENTS

FI  WO2013079761 A1  6/2013

OTHER PUBLICATIONS

U.S. Appl. No. 15/582,421, filed Apr. 28, 2017 Systems and Methods for Reducing Effects of Torsional Oscillation for Electrical Power Generation.

*Primary Examiner* — Pedro J Cuevas
(74) *Attorney, Agent, or Firm* — Patterson + Sheridan, LLP

(57) ABSTRACT

A main field circuit of an electrical generator and associated system and method are disclosed. The main field circuit comprises a main field winding configured to conduct a main field current, and a counter-field winding arranged proximate to the main field winding. The main field circuit further comprises a switch element configured to selectively couple at least a portion of the main field current into the counter-field winding to reduce a magnitude of the main field current. Coupling at least a portion of the main field current into the counter-field winding may be performed responsive to one or predefined conditions, such as a predefined load fault condition and enabling a predefined field weakening operation.

20 Claims, 6 Drawing Sheets

(56) References Cited

U.S. PATENT DOCUMENTS

| | | | | |
|---|---|---|---|---|
| 2,330,993 A * | 10/1943 | Perrine | H02P 7/34 307/101 |
| 2,386,040 A * | 10/1945 | Edwards | H02P 9/22 322/28 |
| 2,497,492 A * | 2/1950 | Dyer | H02P 3/12 318/57 |
| 2,568,407 A * | 9/1951 | Pattison | H02P 9/26 322/28 |
| 2,598,124 A * | 5/1952 | Holt | B60L 11/04 290/17 |
| 3,142,029 A * | 7/1964 | Keen, Jr. | H01F 27/362 336/200 |
| 3,250,859 A * | 5/1966 | Fisher | H04Q 3/54 379/219 |
| 3,544,881 A * | 12/1970 | Nowakowski | H02J 7/166 322/25 |
| 3,835,363 A * | 9/1974 | Kirk | H02J 7/163 320/123 |
| 4,031,439 A * | 6/1977 | Sakai | B66B 1/30 361/31 |
| 4,383,215 A * | 5/1983 | Frister | H02K 19/26 322/28 |
| 4,496,888 A * | 1/1985 | Campbell | B60L 15/08 318/284 |
| 4,574,275 A * | 3/1986 | Morishita | H02J 7/1461 320/136 |
| 5,645,745 A * | 7/1997 | Hartwick | F01N 3/2013 123/179.28 |
| 5,924,629 A | 7/1999 | Kobayashi et al. | |
| 7,106,030 B2 | 9/2006 | Isurin et al. | |
| 7,977,910 B2 | 7/2011 | Osman et al. | |
| 8,198,871 B2 | 6/2012 | Wild | |
| 8,975,876 B2 * | 3/2015 | Rozman | H02P 9/305 322/28 |
| 9,564,845 B2 | 2/2017 | Krolak et al. | |
| 2006/0181251 A1 | 8/2006 | Velhner et al. | |
| 2006/0290324 A1 | 12/2006 | Jabaji | |
| 2008/0238373 A1 | 10/2008 | Eldery et al. | |
| 2010/0007312 A1 | 1/2010 | Petkov | |
| 2010/0007313 A1 | 1/2010 | Jakeman et al. | |
| 2010/0079117 A1 | 4/2010 | Bekiarov | |
| 2010/0134074 A1 | 6/2010 | Crane | |
| 2012/0153904 A1 | 6/2012 | Albsmeier | |
| 2013/0193903 A1 | 8/2013 | Illiano | |
| 2014/0266079 A1 | 9/2014 | Rozman et al. | |
| 2014/0266080 A1 | 9/2014 | Silander | |
| 2016/0141988 A1 | 5/2016 | Krolak et al. | |

* cited by examiner

COUNTER-FIELD WINDING IN ELECTRICAL GENERATOR

FIELD

Embodiments of the present disclosure relate generally to electrical generators, and more specifically to techniques for addressing undesired effects of main field current in an electrical generator under certain conditions.

BACKGROUND

Generators are used to generate a majority of the power on current electric power grids. These generators, which can be synchronous generators or permanent magnet generators, for example, are used to convert mechanical energy from internal combustion, wind, nuclear, and hydraulic sources, for example, into electrical energy. Modern generators can produce hundreds of megawatts each.

Modern wound-rotor generators include a rotor and a stator, each with one or more electrical windings. A magnetic field on the rotating rotor is generated by a current passing through the rotor winding, which induces an electrical current in the stator winding(s) and creates alternating current (AC) electricity. An output voltage of the generator can be controlled by controlling the current flow in the rotor winding (and therefore the strength of the magnetic field, which induces a voltage on the stator winding(s)). In some cases, the current flow in the rotor winding may be supplied by a direct electrical connection to the generator controller using, e.g., slip rings. In other cases, the current flow may be controlled from the generator controller using an armature winding to the rotor through electromagnetic induction. One or more loads can be connected to, and powered by, the output of the stator. In some embodiments, the output of the stator can be rectified to produce direct current (DC) electricity.

During a load fault condition, such as a short-circuit fault occurring in the load, the electrical energy delivered by the electrical generator to the load should be limited to reduce a severity of consequences of the fault. However, even though the generator controller can turn off the exciter current, the rotor magnetic field will not immediately fall to zero due to the stored magnetic energy in the main field windings and a relatively large time constant. This condition results in the field current "free-wheeling" through the components of the rotor which, in turn, causes the main armature to continue producing current. Unfortunately, this current is being provided to a short-circuit, compounding the problem. This makes it difficult to clear the load fault (i.e., because it is still energized) and can overheat both the rotor and the stator. If this condition persists long enough, there is a risk of permanent damage to the load, the distribution system, and/or the generator. To address these and other issues, the present disclosure is submitted.

SUMMARY

According to one or more embodiments, a main field circuit of an electrical generator comprises a main field winding configured to conduct a main field current, and a counter-field winding arranged proximate to the main field winding. The main field circuit further comprises a switch element configured to selectively couple at least a portion of the main field current into the counter-field winding to reduce a magnitude of the main field current.

According to one or more embodiments, a system comprises an electrical generator comprising: a first rotor winding configured to conduct a main field current, and a second rotor winding arranged proximate to the main field winding. The system further comprises a first switch element arranged in series with the second rotor winding, and a controller configured to operate the first switch element to selectively couple at least a portion of the main field current into the second rotor winding to reduce a magnitude of the main field current.

According to one or more embodiments, a method for use with an electrical generator comprises conducting a main field current through a main field winding of the electrical generator, and, responsive to a predefined condition, coupling at least a portion of the main field current into a counter-field winding that is arranged proximate to the main field winding. Coupling at least a portion of the main field current into the counter-field winding operates to reduce a magnitude of the main field current.

The features, functions, and advantages that have been discussed may be achieved independently in various embodiments or may be combined in yet other embodiments, further details of which can be seen with reference to the following description and drawings.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
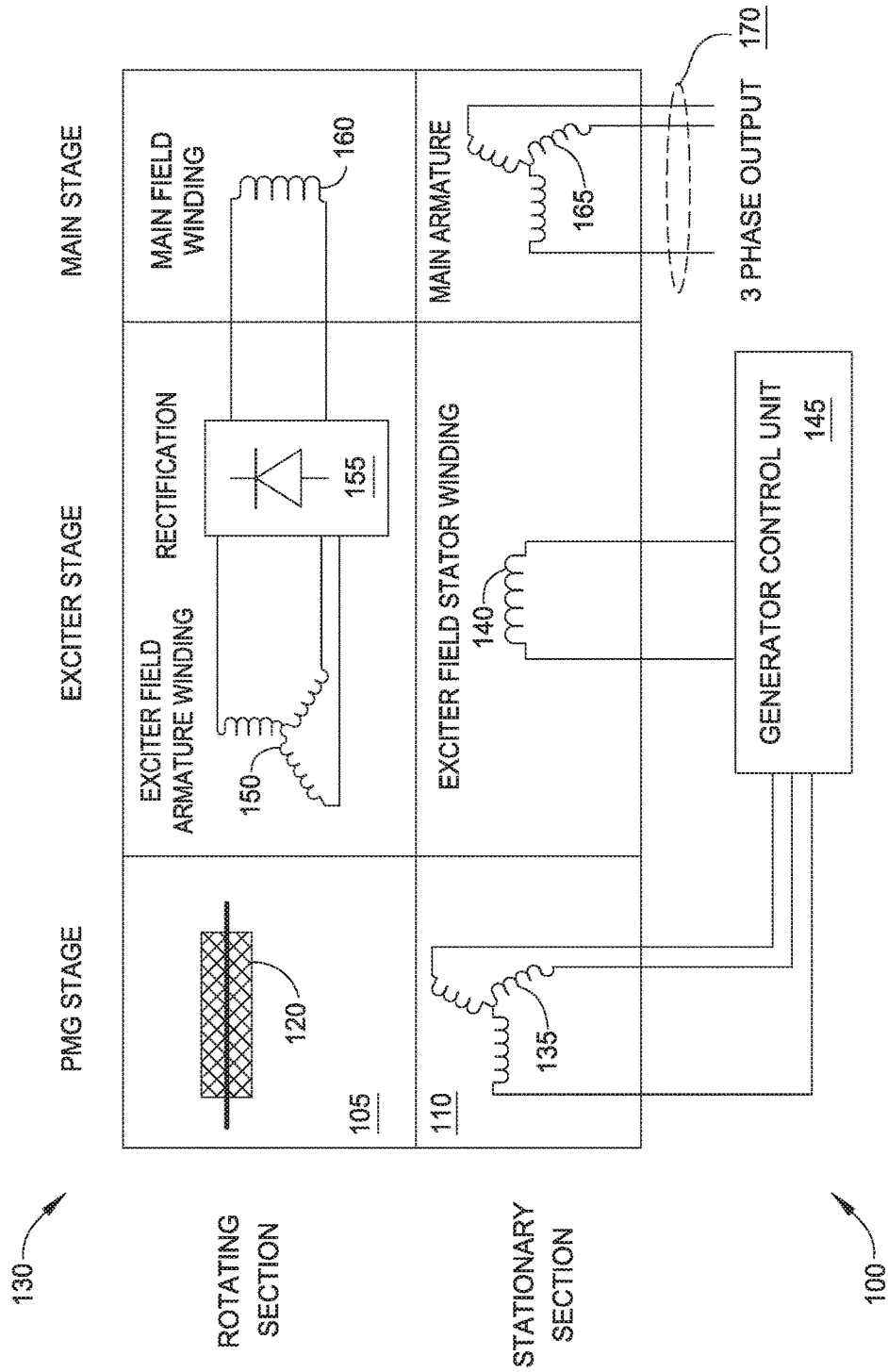
FIG. 1 is a block diagram depicting a three-stage electrical generator.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments of the present disclosure relate generally to electrical generators, and more specifically to techniques for rapidly dissipating main field current in an electrical generator using a counter-field winding arranged proximate to a main field winding. The main field winding is configured to conduct a main field current, and the counter-field winding is arranged such that the main field current flows through the counter-field winding in a direction opposite to the main field winding. In some cases, the net magnetic field generated by the main field winding and the counter-field winding is substantially zero, which substantially eliminates the current that is delivered to the load.

In some embodiments, a switch element is configured to selectively couple at least a portion of the main field current into the counter-field winding to reduce a magnitude of the main field current. Some embodiments may further include a controller, one or more additional switch elements, one or more logic gates, and/or one or more energy dissipation elements. Some non-limiting examples of energy dissipation elements include a resistor, a capacitor, a battery, and so forth.

In some embodiments, the rapid dissipation of the main field current occurs responsive to a predefined condition, such as a predefined load fault condition or the enabling of a predefined field weakening operation. The coupling of the portion of the main field current into the counter-field winding operates to significantly reduce a time constant associated with the main field winding, which in the case of a load fault condition allows a load fault to be cleared more quickly while also protecting the components of the electrical generator.

In some embodiments, the energy in the main field can be dissipated autonomously and without signals from external control circuits. Such a feature greatly simplifies the design and reduces wiring complexity, which tends to increase reliability of the system. In some embodiments, the system can be implemented entirely on and/or in the rotor. In some embodiments, the system can operate using two voltage regimes: (1) a normal operating voltage (or normal voltage range) and (2) a voltage outside the normal operating voltage or normal voltage range. Thus, if the system is operating at a voltage outside the normal operating voltage or normal voltage range, the main field energy can be extracted to enable fault correction.

The materials and components described hereinafter as making up the various elements of the present disclosure are intended to be illustrative and not restrictive. Many suitable materials and components that would perform the same or a similar function as the materials and components described herein are intended to be embraced within the scope of the disclosure. Such other materials and components not described herein can include, but are not limited to, materials and components that are developed after the time of the development of the disclosure.

FIG. 1 is a block diagram depicting a three-stage electrical generator 100. As shown, the electrical generator 100 comprises a synchronous generator, but other types of electrical generators and/or numbers of stages are also contemplated. The electrical generator 100 comprises a rotation section (or "rotor") 105 and a stationary section (or "stator") 110. Within a permanent magnet (PMG) stage 130, a permanent magnet 120 is mounted on the rotor 105, and one or more main windings 135 are mounted on the stator 110. The rotor 105 is coupled with a mechanical power source, some non-limiting examples of which include an internal combustion engine, a turbine powered using wind, steam, or water, and so forth.

In an exciter stage of the electrical generator 100, an exciter field stator winding 140 is mounted on the stator 110 and is communicatively coupled with a generator control unit 145 that is configured to regulate the exciter field current generated from the PMG stage 130. In the exciter stage, one or more exciter field armature windings 150 are located on the rotor 105. The output current from the exciter field armature windings 150 are rectified by a three-phase rectifier 155 to produce a DC current. The rectified DC current is then conducted to the main field winding 160 of a main stage of the electrical generator 100.

The main stage comprises the main field winding 160 located on the rotor 105, and one or more main armature windings 165 (as shown, three windings corresponding to three-phase power generation) located on the stator 110. The three-phase output 170 from the main armature windings 165 may be connected to a distribution bus, fuse panel, or directly to one or more loads.

Although not shown, the exciter stage may further comprise an exciter power supply and an exciter driver coupled with the one or more main windings 135. The generator control unit 145 can vary the voltage and/or current to the exciter driver to control the output voltage and current generated by the electrical generator 100.

Figure 2:
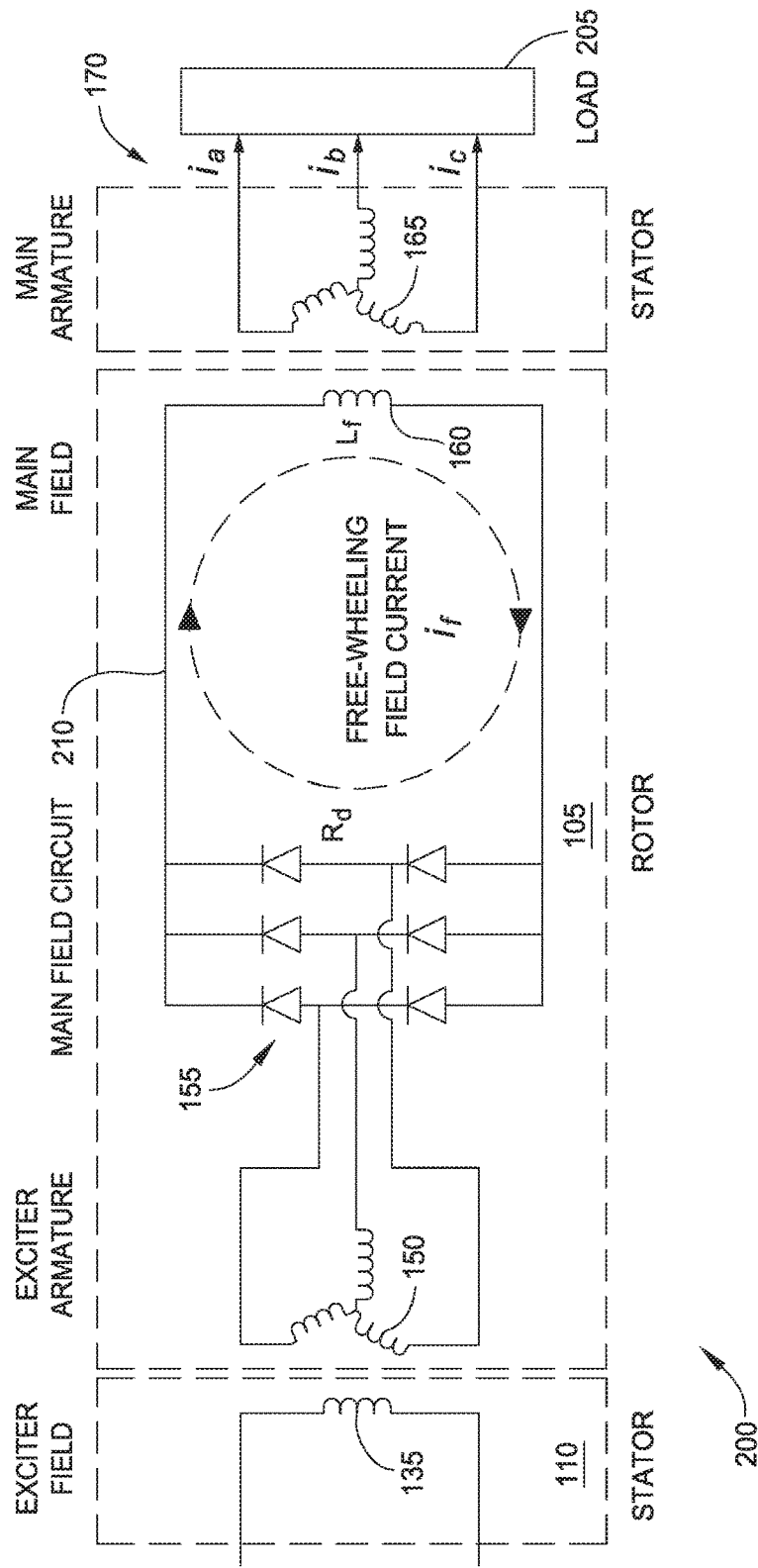
FIG. 2 is a circuit schematic depicting an electrical generator during a load fault condition.

FIG. 2 is a circuit schematic depicting an electrical generator 200 during a load fault condition. As discussed above, one problem that occurs in the electrical generator 200 is when a load 205 that is coupled with the three-phase output 170 experiences a load fault. Some non-limiting examples of the load fault include a partial or complete short circuit occurring in the load 205. In the case of a load fault, the associated generator control unit (e.g., generator control unit 145 of FIG. 1) senses the load fault and responsively shuts off the current provided by the exciter field armature windings 150 (e.g., by disabling output to the one or more main windings 135).

However, even reducing the current provided by the exciter field armature windings 150 to zero does not operate to stop the main field current $i_f$ immediately, due to the established energy in the main field winding 160 and the relatively large time constant associated with the main field circuit 210. Because the diodes of the rectifier 155 present a relatively small resistance $R_d$, and dissipate relatively little power through their forward voltage drop, the simple RL circuit formed by the main field circuit 210 has a relatively large time constant ($L_f/R_d$), causing the main field current $i_f$ to have a large amplitude for a relatively long duration, which delays the shutdown of the electrical generator 200.

As a result, the main field current $i_f$ continues to flow or "free-wheel" around the main field circuit 210 following a load fault. Although the main field current $i_f$ will slowly decrease, during this time the electrical generator 200 continues to supply current (illustrated as phase currents $i_a$, $i_b$, $i_c$) to the load 205 with a known load fault as long as the main field persists. Because the main armature windings 165 continue to provide a relatively large current to the load 205, this makes it difficult to clear the load fault. Additionally, the high currents in the main armature windings 165 can result in the overheating of various components of the electrical generator 200, such as the windings and/or a wiring harness (not shown), and may further damage the load 205. Thus, the free-wheeling main field current $i_f$ can delay or prevent the electrical generator 200 from reentering service, and can potentially cause damage to the electrical generator 200 and/or associated wiring.

Figure 3:
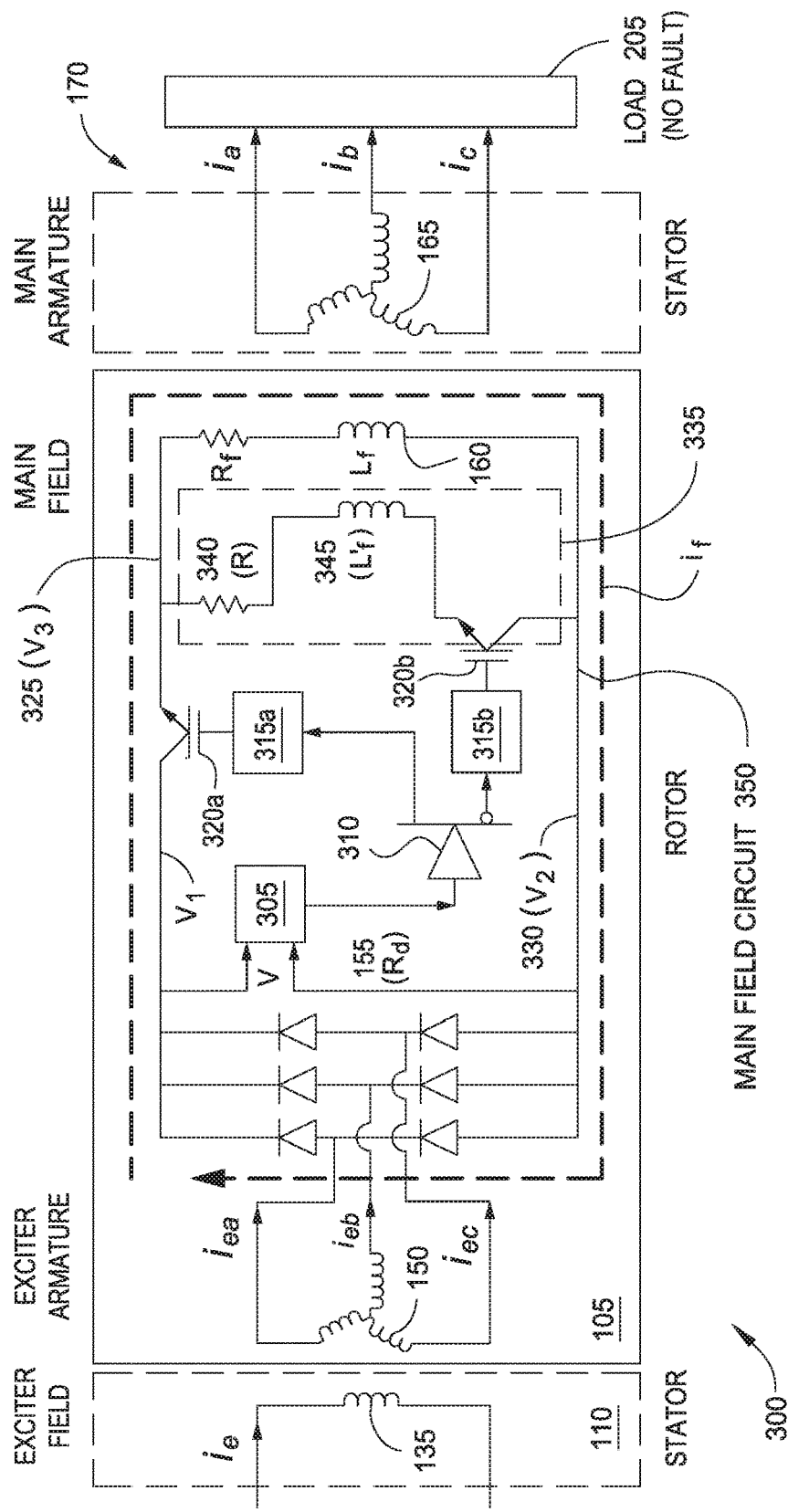
FIG. 3 is a circuit schematic depicting exemplary normal operation of an electrical generator having a counter-field winding, according to embodiments disclosed herein.

FIG. 3 is a circuit schematic depicting exemplary normal operation of an electrical generator 300 having a counter-field winding 345, according to embodiments disclosed herein. In some cases, "normal" operation of the electrical generator 300 corresponds to a condition in which no load fault is detected. In some cases, "normal" operation of the electrical generator 300 corresponds to a condition in which a field weakening operation is not enabled. While components of the exciter stage and the main stage of the electrical generator 300 are depicted, components of the PMG stage are not depicted.

In the electrical generator 300, the main field circuit 350 comprises a controller 305, a logic gate 310, one or more switch drivers 315a, 315b (generically switch driver 315), and one or more controllable switch elements 320a, 320b (generically, switch element 320). The controller 305 may comprise one or more computer processors in any suitable implementation. Some non-limiting examples of the controller 305 include a microprocessor, a digital signal processor (DSP), an application-specific integrated chip (ASIC), and a field programmable gate array (FPGA). In another example implementation, the controller 305 may be as simple as a single comparator configured to compare an output voltage with a nominal voltage. For such an example implementation, no-fault operation of the electrical generator 300 may correspond to the nominal voltage, and a load fault is indicated by an output voltage different than the nominal voltage. In yet another example implementation, the controller 305 may determine whether an output voltage falls within a predefined voltage range, and a load fault is indicated by the output voltage that falls outside the predefined voltage range.

The logic gate 310 is communicatively coupled with an output of the controller 305. As shown, the logic gate 310 provides complementary outputs to the two switch drivers 315a, 315b, which are used to drive the respective switch elements 320a, 320b. For example, during no-fault operation of the electrical generator 300, the controller 305 outputs a logic "high" signal to the logic gate 310. In turn, the logic gate 310 transmits a logic "high" to the switch driver 315a to maintain the switch element 320a in a conducting state, and transmits a logic "low" to switch driver 315b to maintain the switch element 320b in a non-conducting state, and vice versa. While the logic gate 310 is depicted as a complementary buffer element, additional or alternative logic may be implemented in the main field circuit 350. In an alternate embodiment, the logic gate 310 and/or the switch drivers 315 may be integrated in the controller 305.

The switch drivers 315a, 315b may have any suitable implementation. In some embodiments, the switch drivers 315a, 315b comprise gate drivers respectively configured to drive gate terminals of the switch elements 320a, 320b. Beneficially, the switch drivers 315a, 315b may provide an increased switching speed and accuracy for high current levels supported by the main field circuit 350. In an alternate embodiment, the switch drivers 315a, 315b may be omitted, and the switch elements 320a, 320b may be controlled directly from the logic gate 310 or from the controller 305.

The switch elements 320a, 320b may have any suitable implementation for selectively conducting current, which in some cases may include the main field current $i_f$ (or a portion thereof). Some non-limiting examples of the switch elements 320a, 320b include a switching diode, transistors such as insulated-gate bipolar transistors (IGBTs), Bipolar Junction Transistors (BJTs), and metal-oxide-semiconductor field-effect transistors (MOSFETs), and so forth.

The main field winding 160 is arranged between a first leg 325 and a second leg 330 of the main field circuit 350. The main field circuit 350 further comprises a branch 335 that is arranged between the first leg 325 and the second leg 330, and in parallel with the main field winding 160. As shown, the branch 335 comprises a series connection of a resistance 340, the counter-field winding 345, and the switch element 320b.

The counter-field winding 345 is arranged proximate to the main field winding 160. As discussed herein, "arranged proximate" indicates that the magnetic field that is generated by the counter-field winding 345 provides a significant mitigation of the magnetic field that is generated by the main field winding 160 (i.e., the main field). As a result of the mitigated main field, the current that is supplied by the main armature windings 165 to the load 205 (shown as phase currents $i_a$, $i_b$, $i_c$) is correspondingly reduced. Thus, by selectively conducting current through the counter-field winding 345, the magnetic field generated by the main field winding 160 (and the current supplied to the load 205) may be selectively reduced. In some embodiments, the switch elements 320a and/or 320b are used to selectively couple at least a portion of the main field current $i_f$ into the counter-field winding 345 to reduce a magnitude of the main field current $i_f$.

Although the main field winding 160 and the counter-field winding 345 are each depicted as a singular winding, alternate implementations may include multiple windings (such as segmented windings) for the main field winding 160 and/or the counter-field winding 345.

In some embodiments, the main field circuit 350 is configured to reduce a net magnetic field generated by the main field winding 160 and the counter-field winding 345 by a predetermined amount. In some embodiments, the arrangement of the main field winding 160 and the counter-field winding 345 is such that the net magnetic field is substantially zero, which substantially eliminates the current that is supplied to the load 205. In some embodiments, a first inductance $L'_f$ of the counter-field winding 345 is substantially equal to a second inductance $L_f$ of the main field winding 160.

In some embodiments, the combined operation of the main field winding 160 and the counter-field winding 345 is effective to substantially eliminate the current that is supplied to the load 205, such that no separate elements need be included in the main field circuit 350 for dissipating energy from the main field current $i_f$. However, due to their respective electrically conductive properties, the main field winding 160 exhibits a resistance $R_f$ and the counter-field winding 345 also exhibits a resistance, each of which acts to dissipate energy when current flows through the respective winding. In some cases, the resistance 340 may represent the resistance of the counter-field winding 345. However, in some cases the branch 335 may further comprise one or more dissipation elements that are each configured to absorb or otherwise dissipate energy when current flows through the branch 335. In such cases, the resistance 340 may include a separately installed resistor that is arranged in series with the counter-field winding 345. Other non-limiting examples of dissipation elements include capacitors and batteries.

In some embodiments, the resistance 340 of the branch 335 is selected to provide a desired time constant of the main field circuit 350 when the counter-field winding is arranged in parallel with the main field winding 160. For example, the counter-field winding 345 and/or a separately installed resistor may be dimensioned to provide the resistance 340 corresponding to the desired time constant. In some cases, the desired time constant may be further based on the resistance $R_f$ of the main field winding 160. For example, in FIG. 4 the main field current $i_f$ is directed through a series connection of the branch 335 and the main field winding 160. The time constant of the equivalent RL circuit may be represented as:

$$\tau = \frac{L_f + L'_f}{R_f + R} \quad (1)$$

In some embodiments, at least a portion of the branch 335 is physically coupled with a rotor shaft of the electrical generator 300 to transfer resistive heat away from the branch 335. The rotor shaft typically has a relatively large mass compared with the components of the branch 335, and may be suitable for conducting heat away from the components. In one example, the counter-field winding 345 and/or a separately installed resistor are mounted on the rotor shaft.

During operation of the electrical generator 300 in a normal condition, an exciter field current $i_e$ is provided to the one or more main windings 135, which induces current in the one or more exciter field armature windings 150 (illustrated as phase currents $i_{ea}$, $i_{eb}$, $i_{ec}$). The phase currents $i_{ea}$, $i_{eb}$, $i_{ec}$ flow into the rectifier 155, and each phase current $i_{ea}$, $i_{eb}$, $i_{ec}$ contributes to the rectified main field current $i_f$.

A system voltage V provided to the controller 305 may be defined as:

$$V = V_1 - V_2 \quad (2)$$

As shown, the system voltage V represents a voltage across the rectifier 155. In some embodiments, the system voltage V may be used as a power source for the controller 305, the logic gate 310, the switch drivers 315, and/or the switch elements 320. In other embodiments, the power for some or all of these components can be provided using external power source(s).

During normal operation of the electrical generator 300, the system voltage V is positive (i.e., V>0). More specifically, $V_1-V_2>0$ and $V_1-V_3>0$. Under these conditions, the switch element 320a is in a conducting state and the switch element 320b is in a non-conducting state. Thus, the main field current $i_f$ is provided to the main field winding 160, which induces phase currents $i_a$, $i_b$, $i_c$ that are provided to the load 205. With the switch element 320b in a non-conducting state, the components of the branch 335 are substantially electrically isolated from the main field circuit 350.

Figure 4:
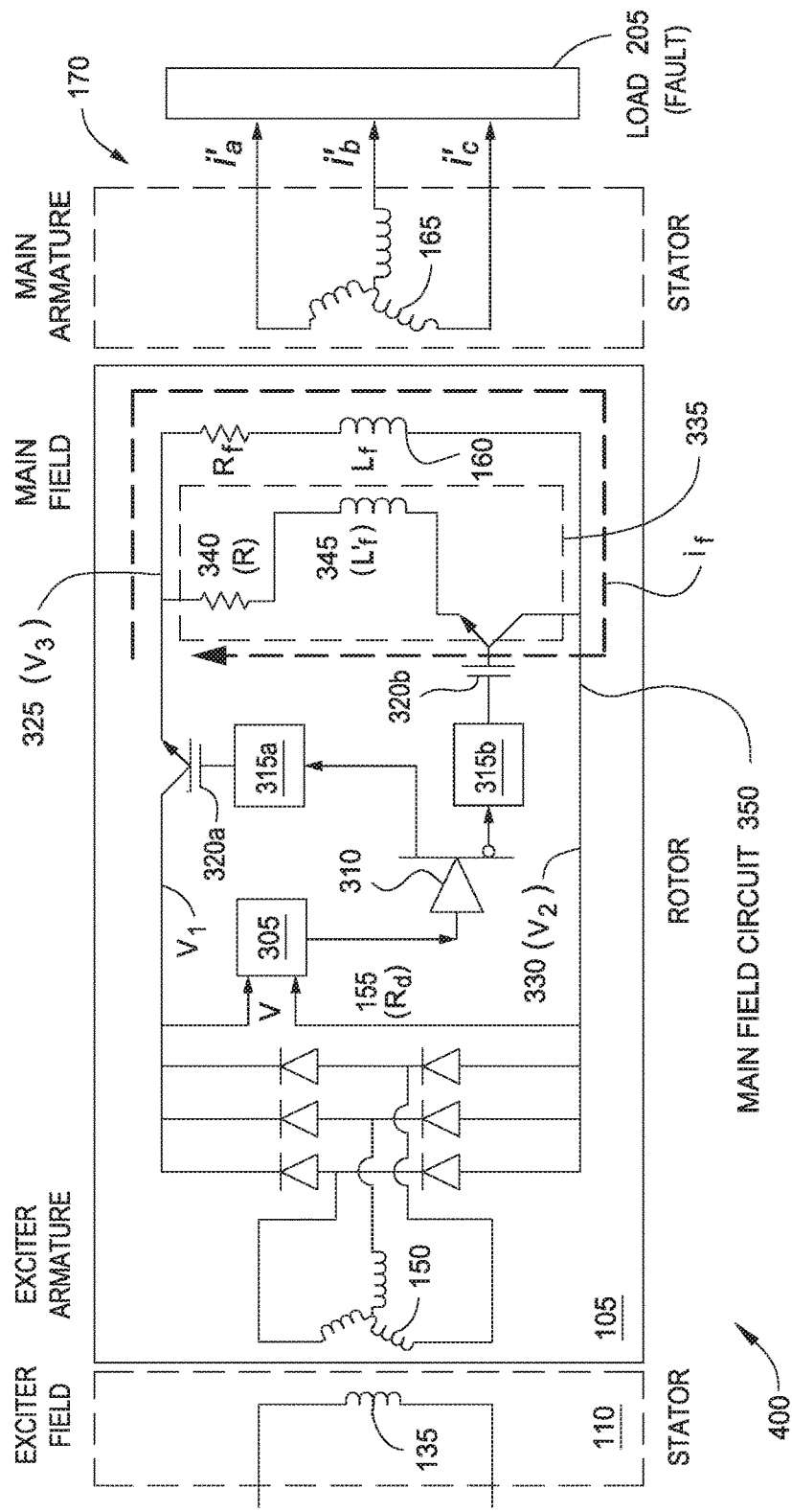
FIG. 4 is a circuit schematic depicting exemplary load-fault operation of an electrical generator having a counter-field winding, according to embodiments disclosed herein.

In contrast, FIG. 4 depicts exemplary load-fault operation of an electrical generator 400 having a counter-field winding 345, according to embodiments disclosed herein. Alternately, FIG. 4 may correspond to operation of the electrical generator 400 responsive to another predefined condition, such as during a predefined field-weakening operation of the electrical generator 400.

Responsive to detecting a load fault of the load 205, the generator control unit (not shown) for the electrical generator 400 shuts off the exciter field current to the one or more main windings 135. However, because the main field energy is already established in the main field winding 160, the main field current $i_f$ tends to flow or "free-wheel" around the main field circuit 350. Without the current contribution from the rectifier 155, the main field current $i_f$ slowly decreases, but the electrical generator 400 will supply current to the load 205 (despite the known load fault) as long as the main field persists.

Due to the decreasing the main field current $i_f$, a voltage across the main field winding 160 experiences a polarity reversal (i.e., $V_2-V_3>0$). Additionally, the system voltage V also experiences a polarity reversal (i.e., $V_1-V_2<0$). Under these conditions, the switch element 320a is in a non-conducting state and the switch element 320b is in a conducting state.

In one embodiment, the counter-field winding 345 is arranged in parallel with the main field winding 160 responsive to the controller 305 determining that a voltage difference (i.e., system voltage V) is less than a predetermined value. The main field current $i_f$ is thus directed through the branch 335, instead of through the rectifier 155 and the switch element 320a. Due to the relative arrangement of the counter-field winding 345 and the main field winding 160, the flow of the main field current $i_f$ through the counter-field winding 345 produces a magnetic field that mitigates the main field generated by the main field winding.

As shown, the same magnitude of current flows through the main field winding 160 and through the counter-field winding 345, but in opposite directions. As a result, the net magnetic field is substantially zero, and no electromotive force is generated in the main armature windings 165. This results in a reduction of the current supplied to the load 205 to substantially zero (i.e., phase currents $i'_a=i'_b=i'_c=0$), which in some cases is accomplished substantially instantaneously. In any event, the reduction of the current supplied to the load 205 is accomplished much more quickly than the slow reduction that is associated with implementations of the main field circuit having the large time constant (i.e., $L_f/R_d$, as in electrical generator 200 of FIG. 2). Beneficially, the load fault may be cleared more quickly, and the overheating and/or damage to components of the electrical generator 400 and/or to the load 205 may be avoided.

Although described in terms of enabling or disabling the branch 335 to conduct the entire amount of the main field current $i_f$ through the counter-field winding 345, alternate embodiments of the main field circuit 350 may further control the amount of current that flows through the counter-field winding to achieve a desired reduction of the net magnetic field (e.g., during a field-weakening operation). In one example, the main field circuit 350 may be configured to redirect only a portion of the main field current $i_f$ through the counter-field winding 345. In another example, the main field circuit 350 may comprise a current source separate from the main field current $i_f$ to conduct a desired amount of current through the counter-field winding 345.

Figure 5:
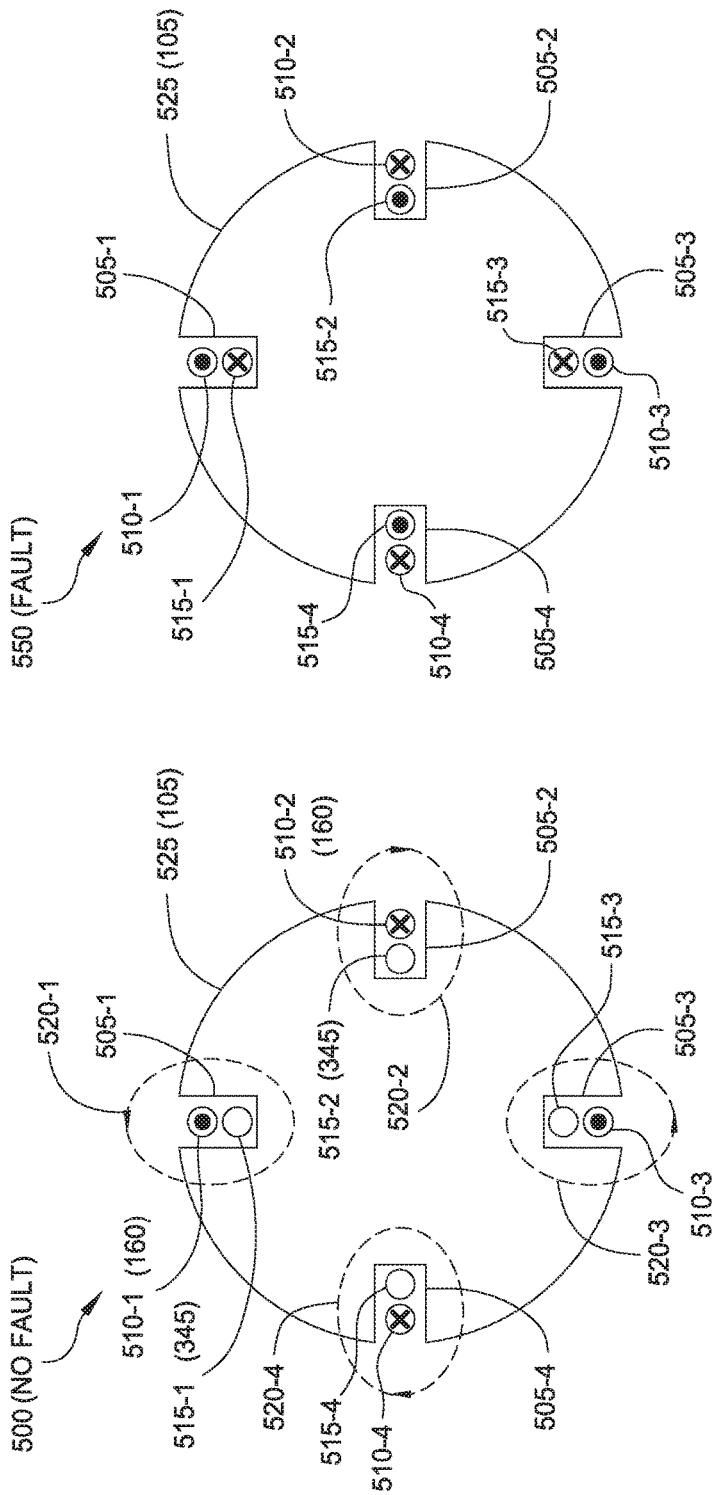
FIG. 5A is a diagram illustrating a rotor having a plurality of slots during exemplary normal operation, according to embodiments disclosed herein.
FIG. 5B is a diagram illustrating a rotor having a plurality of slots during exemplary load-fault operation, according to embodiments disclosed herein.

FIG. 5A is a diagram 500 illustrating a rotor having a plurality of slots, during exemplary normal operation, according to embodiments disclosed herein. More specifically, the diagram 500 corresponds to a cross-sectional view of a four-pole implementation of the rotor 105. The implementation illustrated in diagram 500 may be used in conjunction with other embodiments, such as the electrical generators 300, 400 illustrated in FIGS. 3, 4.

The rotor 105 defines a plurality of slots 505-1, 505-2, 505-3, 505-4 (generically, a slot 505) extending inward from an external surface 525 of the rotor 105. Each slot 505-1, 505-2, 505-3, 505-4 includes a respective portion 510-1, 510-2, 510-3, 510-4 (generically, a portion 510) of the main field winding 160 and a respective portion 515-1, 515-2, 515-3, 515-4 (generically, a portion 515) of the counter-field winding 345. As shown, the portions 510, 515 are in a stacked configuration in which the portions 510 are arranged closer to the external surface 525 of the rotor 105 than the portions 515. The main field winding 160 and the counter-field winding 345 are electrically insulated from each other, and from the rotor 105.

Other arrangements are also possible for a suitable reduction of the net magnetic field produced by the main field winding 160 and the counter-field winding 345. In one example, each slot 505 may include respective portions 510, 515 in a side-by-side arrangement (e.g., substantially a same distance from the external surface 525 of the rotor 105). In other examples, the portions 510, 515 need not be arranged in the same slots 505, but are arranged such that the magnetic fields produced by the portions 515 suitably mitigate the magnetic fields produced by the portions 510.

During normal operation of the electrical generator (e.g., no load fault detected, no field-weakening operation enabled), the main field current flows through the portions 510-1, 510-3 in a first direction (as viewed, out of the page) and through the portion 510-2, 510-4 in a second direction (as viewed, into the page). Substantially no current flows through the counter-field winding 345.

The current flow through each of the portions 510-1, 510-2, 510-3, 510-4 induces a respective magnetic field 520-1, 520-2, 520-3, 520-4 (generically, a magnetic field 520). As viewed, the magnetic fields 520-1, 520-3 have magnetic field lines in a counter-clockwise direction, and the magnetic fields 520-2, 520-4 have magnetic field lines in a clockwise direction. The magnetic fields 520 couple with the main armature windings (e.g., main armature windings 165 of FIGS. 3, 4) to supply current to a connected load.

In contrast, FIG. 5B is a diagram 550 illustrating a rotor having a plurality of slots during exemplary load-fault operation, according to embodiments disclosed herein. The diagram 550 may alternately correspond to a predefined condition, such as a predefined field weakening operation of the electrical generator. In diagram 550, current flows through the portions 515-1, 515-2, 515-3, 515-4 of the counter-field winding 345. Within each slot 505, the current flows through the respective portion 515 in a direction opposite the direction of the main field current in the respective portion 510. In this way, the magnetic fields generated by the portions 515 counteract (or mitigate) the magnetic fields generated by the portions 510.

As shown, the net magnetic field is substantially zero, which may correspond to a case in which the entire amount of the main field current is directed through the main field winding 160 and the counter-field winding 345, and in which the inductances of the main field winding 160 and the counter-field winding 345 are substantially equal. In other embodiments, the magnetic fields generated by the portions 515 need not entirely mitigate the magnetic fields generated by the portions 510.

Figure 6:
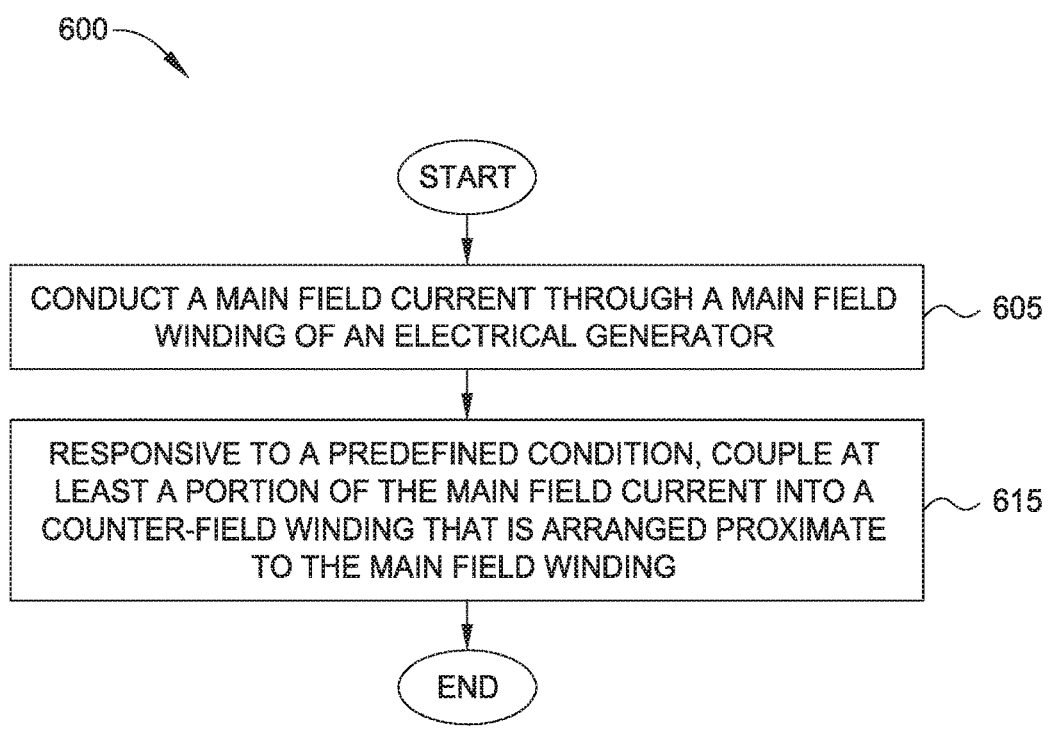
FIG. 6 is a method for use with an electrical generator, according to embodiments disclosed herein.

FIG. 6 is a method 600 for use with an electrical generator, according to embodiments disclosed herein. The method 600 may be used in conjunction with other embodiments, such as the main field circuit 350 illustrated in FIGS. 3, 4.

Method 600 begins at block 605, where the main field circuit conducts a main field current through a main field winding of the electrical generator. At block 615, and responsive to a predefined condition, the main field circuit couples at least a portion of the main field current into a counter-field winding that is arranged proximate to the main field winding. In one embodiment, the predefined condition comprises a predefined load fault condition. In another embodiment, the predefined condition comprises enabling a predefined field weakening operation of the electrical generator.

Coupling at least a portion of the main field current into the counter-field winding operates to reduce a magnitude of the main field current. In one embodiment, coupling at least a portion of the main field current into the counter-field winding comprises operating a switch element to arrange the counter-field winding in parallel with the main field winding between a first leg and a second leg of a main field circuit of the electrical generator. In one embodiment, a first inductance of the counter-field winding is substantially equal to a second inductance of the main field winding, and the entire amount of the main field current is coupled into the counter-field winding. Method 600 ends following completion of block 615.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the Figures illustrate the architecture, functionality and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. A main field circuit of an electrical generator, the main field circuit comprising:
    a main field winding configured to conduct a main field current;
    a counter-field winding arranged proximate to the main field winding; and
    a switch element configured to selectively couple at least a portion of the main field current into the counter-field winding to reduce a magnitude of the main field current.

2. The main field circuit of claim 1, wherein the switch element is configured to couple at least a portion of the main field current into the counter-field winding responsive to detecting a predefined load fault condition.

3. The main field circuit of claim 1, wherein a first inductance of the counter-field winding is substantially equal to a second inductance of the main field winding.

4. The main field circuit of claim 1, wherein the electrical generator comprises a rotor defining a plurality of slots,
wherein each slot of the plurality of slots includes a respective portion of the main field winding and a respective portion of the counter-field winding.

5. The main field circuit of claim 1, wherein coupling at least a portion of the main field current into the counter-field winding comprises arranging the counter-field winding in parallel with the main field winding between a first leg and a second leg of the main field circuit.

6. The main field circuit of claim 5, wherein arranging the counter-field winding in parallel with the main field winding occurs responsive to determining that a voltage difference between the first leg and the second leg is less than a predetermined value.

7. The main field circuit of claim 5, wherein the counter-field winding is included in a branch arranged between the first leg and the second leg, wherein a resistance of the branch is selected to provide a desired time constant of the main field circuit when the counter-field winding is arranged in parallel with the main field winding.

8. The main field circuit of claim 7, wherein at least a portion of the branch is physically coupled with a rotor shaft of the electrical generator to transfer resistive heat away from the branch.

9. A system comprising:
an electrical generator comprising:
a first rotor winding configured to conduct a main field current;
a second rotor winding arranged proximate to the main field winding;
a first switch element arranged in series with the second rotor winding; and
a controller configured to operate the first switch element to selectively couple at least a portion of the main field current into the second rotor winding to reduce a magnitude of the main field current.

10. The system of claim 9, wherein the controller is configured to operate the first switch element in a conducting state responsive to detecting a predefined load fault condition.

11. The system of claim 10, further comprising:
a second switch element,
wherein the controller is further configured to operate the second switch element to selectively decouple an exciter armature current from being added into the main field winding.

12. The system of claim 9, wherein a first inductance of the first rotor winding is substantially equal to a second inductance of the second rotor winding.

13. The system of claim 9, wherein the electrical generator further comprises a rotor defining a plurality of slots,
wherein each slot of the plurality of slots includes a respective portion of the first rotor winding and a respective portion of the second rotor winding.

14. The system of claim 9, wherein coupling at least a portion of the main field current into the second rotor winding comprises arranging the second rotor winding in parallel with the first rotor winding between a first leg and a second leg of a main field circuit of the electrical generator.

15. The system of claim 14, wherein arranging the second rotor winding in parallel with the first rotor winding occurs responsive to the controller determining that a voltage difference between the first leg and the second leg is less than a predetermined value.

16. A method for use with an electrical generator, the method comprising:
conducting a main field current through a main field winding of the electrical generator; and
responsive to a predefined condition, coupling at least a portion of the main field current into a counter-field winding that is arranged proximate to the main field winding,
wherein coupling at least a portion of the main field current into the counter-field winding operates to reduce a magnitude of the main field current.

17. The method of claim 16, wherein the predefined condition comprises a predefined load fault condition.

18. The method of claim 16, wherein the predefined condition comprises enabling a predefined field weakening operation of the electrical generator.

19. The method of claim 16, wherein a first inductance of the counter-field winding is substantially equal to a second inductance of the main field winding.

20. The method of claim 16, wherein coupling at least a portion of the main field current into the counter-field winding comprises operating a switch element to arrange the counter-field winding in parallel with the main field winding between a first leg and a second leg of a main field circuit of the electrical generator.

* * * * *